(12) United States Patent  
Baeza Rischter

(10) Patent No.: US 9,101,146 B2  
(45) Date of Patent: Aug. 11, 2015

(54) APPARATUS FOR SLAUGHTERING FISHES

(71) Applicant: Osvaldo Joaquin Baeza Rischter, Puerto Montt (CL)

(72) Inventor: Osvaldo Joaquin Baeza Rischter, Puerto Montt (CL)

(*) Notice: Subject to any disclaimer, the term of this patent is extended or adjusted under 35 U.S.C. 154(b) by 0 days.

(21) Appl. No.: 14/377,117

(22) PCT Filed: Jan. 30, 2013

(86) PCT No.: PCT/IB2013/050804  
§ 371 (c)(1),  
(2) Date: Aug. 6, 2014

(87) PCT Pub. No.: WO2013/118032  
PCT Pub. Date: Aug. 15, 2013

(65) Prior Publication Data  
US 2014/0378038 A1    Dec. 25, 2014

(30) Foreign Application Priority Data

Feb. 6, 2012  (CL) ..................................... 307-2012

(51) Int. Cl.  
*A22B 1/00*  (2006.01)  
*A22B 3/08*  (2006.01)

(52) U.S. Cl.  
CPC .. *A22B 3/083* (2013.01); *A22B 3/08* (2013.01)

(58) Field of Classification Search  
USPC ............. 452/52–54, 56–63, 65–68, 166, 196, 452/161, 120–123  
See application file for complete search history.

(56) References Cited

U.S. PATENT DOCUMENTS

| 6,183,356 | B1* | 2/2001 | Middleton et al. | 452/57 |
| 6,769,976 | B2* | 8/2004 | Bass | 452/62 |
| 7,220,177 | B2* | 5/2007 | King et al. | 452/62 |
| 7,980,925 | B2* | 7/2011 | Bass | 452/57 |

FOREIGN PATENT DOCUMENTS

| EP | 0917823 A1 | 5/1999 |
| WO | 2004 049810 A1 | 6/2004 |
| WO | 2011021071 A1 | 2/2011 |

* cited by examiner

*Primary Examiner* — Richard Price, Jr.  
(74) *Attorney, Agent, or Firm* — Lucas & Mercanti, LLP

(57) ABSTRACT

An apparatus for slaughtering fishes, killing the fish by taking it from the operculum and positioning in a stunning position and cutting the gills only, without causing any visible damage to the exterior, comprising transverse positioning to receive the fish, holding by the sides and keeping it in the center thereof and positioned in an initial working position; longitudinal positioning, allowing the longitudinal displacement of the fish and stopping its movement when it is in the initial working position; gripping positioning to take the fish from the initial working position, holding it from the operculum and placing it in a stunning position, also allowing the opening of the operculum to expose the gills in a cutting position; stunning positioning to stun the fish in the stunning position; cutting positioning to cut in the gills of stunned fish; and releasing positioning to release of the slaughtered fish.

10 Claims, 12 Drawing Sheets

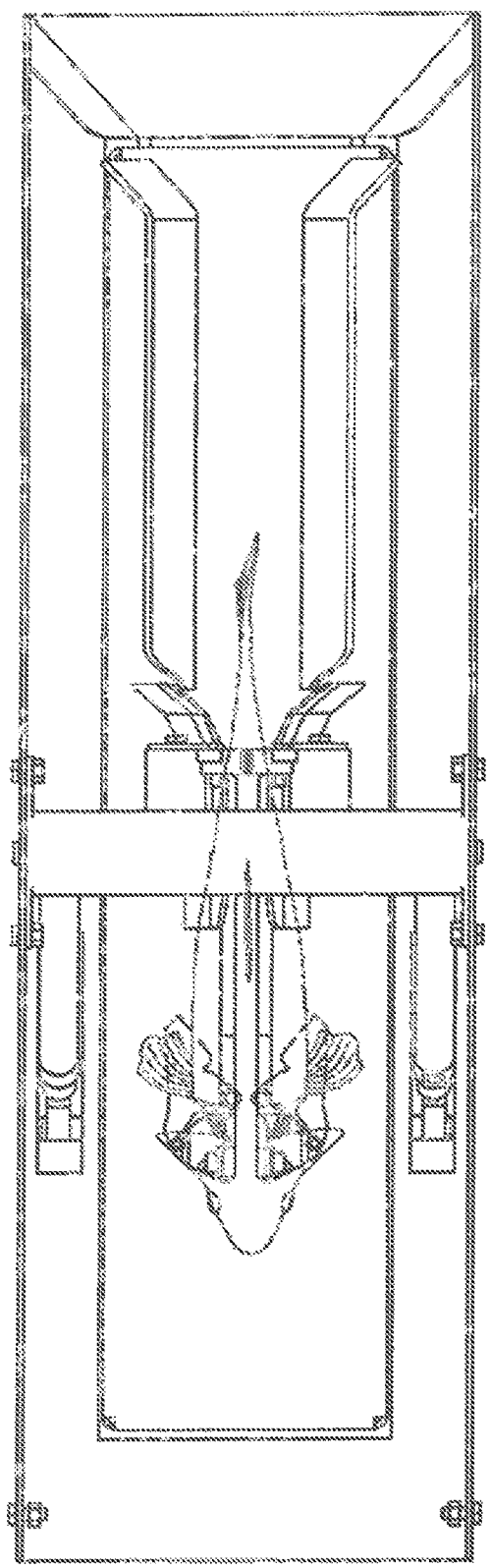

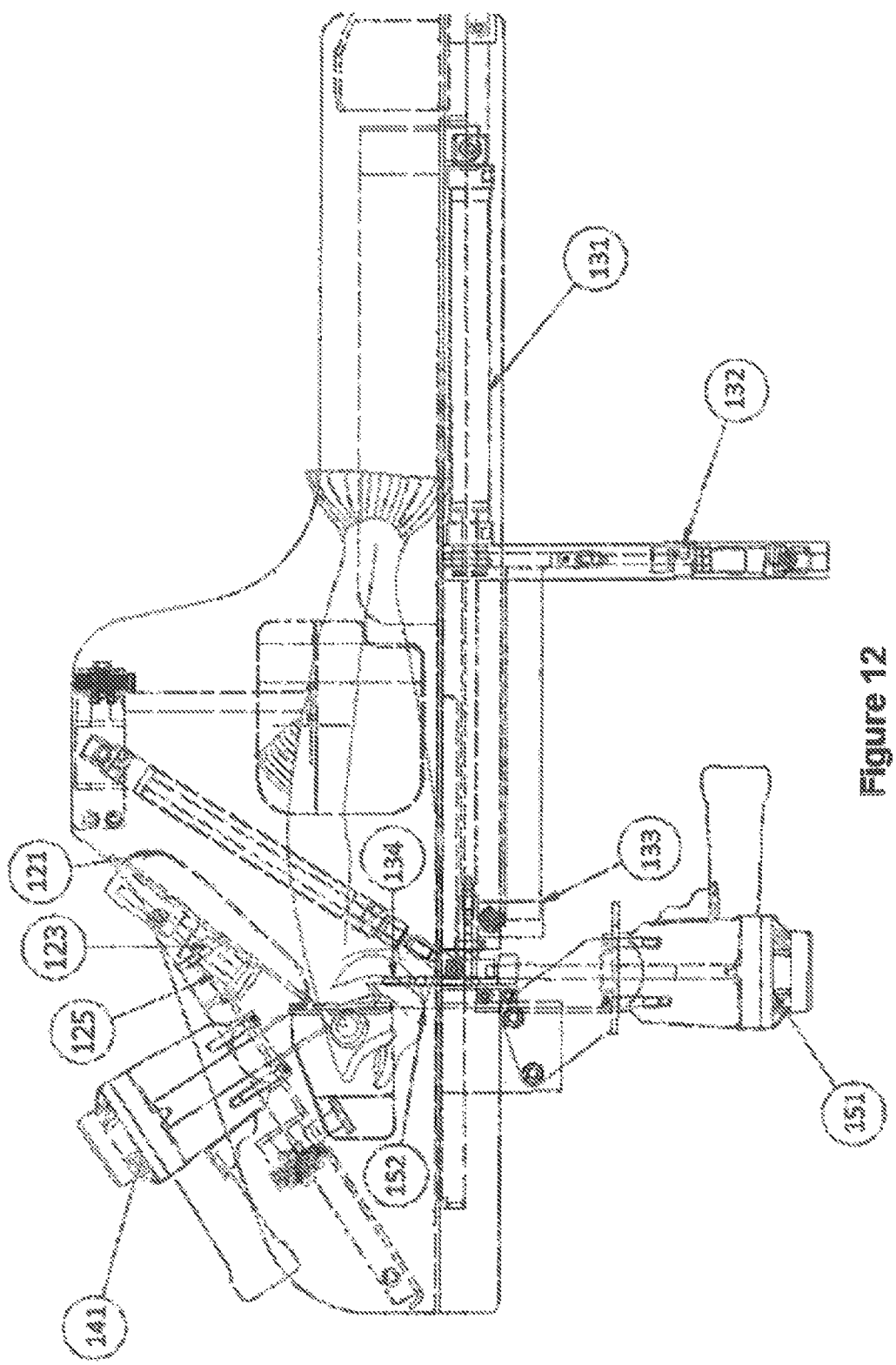

APPARATUS FOR SLAUGHTERING FISHES

CROSS-REFERENCE TO RELATED APPLICATIONS

This application is a 371 of PCT/IB2013/050804 filed Jan. 30, 2013, which in turn claims the priority of CL 307-2012 filed Feb. 6, 2012, the priority of both applications is hereby claimed and both applications are incorporated by reference herein.

FIELD OF THE INVENTION

The present invention relates to the fishing industry, and slaughtering and processing fish, in particular, the present invention consists in an apparatus for slaughtering fish, which allows stunning and cutting the gills of fish of different sizes, without cuts in the skin, thereby minimizing the visual impact on the slaughtered fish.

BACKGROUND OF THE INVENTION

Currently, the process of killing fish is carried out by means of a bump to the head of the fish, which can be performed by manual or pneumatic mode, in order to stun it and reassure the fish. Alternatively, cold solutions can be used as a method of slumber. Following the stunning, using a knife and manually, the gills or the aorta of the fish are cut, inserting the knife in between the operculum (which functions as a protective gill cover), in order to avoid damage on the outside of the fish. This method requires intensive labor and is usually performed during long work hours, which results in, when the operators have been working for a certain time, the possibility of cuts wrongly performed.

On the other hand, there are equipments consisting of a pneumatic puncher and a knife to cut the gills and/or aorta. Nevertheless, these have a major constraint for the industry, which is related to the damage on the outside of the fish produced by inaccurate or poorly designed cutting when inserting the knife to cut the gills. In these cases, a mechanical cut is made in the part of the operculum, leaving a visible cut that significantly reduces the quality and commercial value of the fish.

An example of this is disclosed in patent CA 02254436, which discloses an apparatus and method for slaughtering fish, comprising: means defining a predetermined path, enabling channeling the displacement of the fish; means for interrupting the movement of the fish at a predetermined position along said path; capture means to keep the fish in the predetermined position; means to stun the fish; means to kill the stunned fish; and means for releasing the dead fish. However, the apparatus described in this document exhibits very low versatility in fish morphology to be slaughtered, since it requires calibration to slaughter fish of different sizes; i.e., the apparatus can be configured only to slaughter fish with a homogeneous morphology.

Another similar solution is described in the patent application PCT/IB2010/053671, of the same inventor as the present invention, in which an apparatus for processing fish with self-regulation mechanism according to the morphology of the head of the fish is disclosed, which comprises an assembly to stunning the fish to be processed, a support assembly and a stunning piston assembly; a central assembly comprising a housing, a guide assembly for the input and processing of fish and comprising a lower guide plate, a trigger assembly that triggers the stunning piston assembly and an adjuster assembly which position varies depending on the size of the fish to be processed; a cutter assembly to cut gills or aorta located below the housing; and a pneumatic circuit which connects the trigger assembly, the stunning piston assembly and cutter piston, wherein the trigger assembly activates the pneumatic circuit, said stunning piston and said cutter piston.

However, the apparatus described above depends heavily on operator interaction in the process of slaughtering fish, since it depends on an operator that must enter the fish to the apparatus, hold it as the apparatus slaughters the fish, and remove it manually to continue with the slaughtering process.

Notwithstanding the abovementioned disadvantages, the major limitation of the prior art, which can be clearly appreciated in both documents, corresponds to the existing equipment causing a longitudinal cut in the bottom of the fish, thereby cutting the aorta and/or the operculum, which results in an undesirable visual appearance in the fish, thus causing a devaluation of the fish as a product on the market as being regarded as an inferior product.

Consequently, it can be seen in the prior art that there is a need for an apparatus for slaughtering fish, which allows stunning and killing the fish quickly and accurately, regardless the morphology of the fish, in a manner that prevent skin damage visually perceptible thereof, and enabling at the same time having a high level of automation, in order to minimize the interaction of an operator In the process.

To overcome the problems an apparatus to slaughter fish is provided, causing the death of fish by taking it from the operculum to be positioned in a stunning position, then cutting the gills without causing any visible damage to the outside. Thus, the apparatus comprises:

positioning means for holding and positioning the fish at a predetermined position;

detection means for detecting the positioning the fish and to stop the movement thereof in the predetermined position;

gripping means to take the fish from the operculum and position it in a stunning position, which also allows the opening of the operculum so as to leave the gills exposed;

stunning means to stun the fish that is held from the operculum;

cutting means that cut the gills of the stunned fish in a way that its bleeding occurs without cause external damage; and releasing means to release the dead fish from the apparatus.

Thus, by means of the described apparatus for slaughtering fish, it is possible to stun and kill fish quickly, efficiently, and without causing damage to the external appearance of each fish, since the gripping means allow to position and expose the gills, so that an accurate cut is made, without causing cuts in other unwanted areas.

Moreover, given the configuration of the invention, the apparatus is capable of slaughtering fish with minimal intervention of the operator, since the apparatus allows gripping, positioning, stunning and killing the fish, so that the process can be continued without operator input, due to the releasing means of the apparatus. Thus, the operator must only enter eventually the fish into the apparatus, where the fish will be fished automatically, and it could even dispense with the operator if known means in the prior art that, allowing entry and direct the fish towards the apparatus are used.

BRIEF DESCRIPTION OF FIGURES

FIG. 11 shows an upper view of the apparatus for slaughtering fish, where the manner in which the hooks laterally open the fish can be observed.

FIG. 12 shows a side view of the apparatus for slaughtering fish, where the manner in which the fish is stunned and the knives take the fish can be observed.

DETAILED DESCRIPTION OF THE INVENTION

Figure 1:
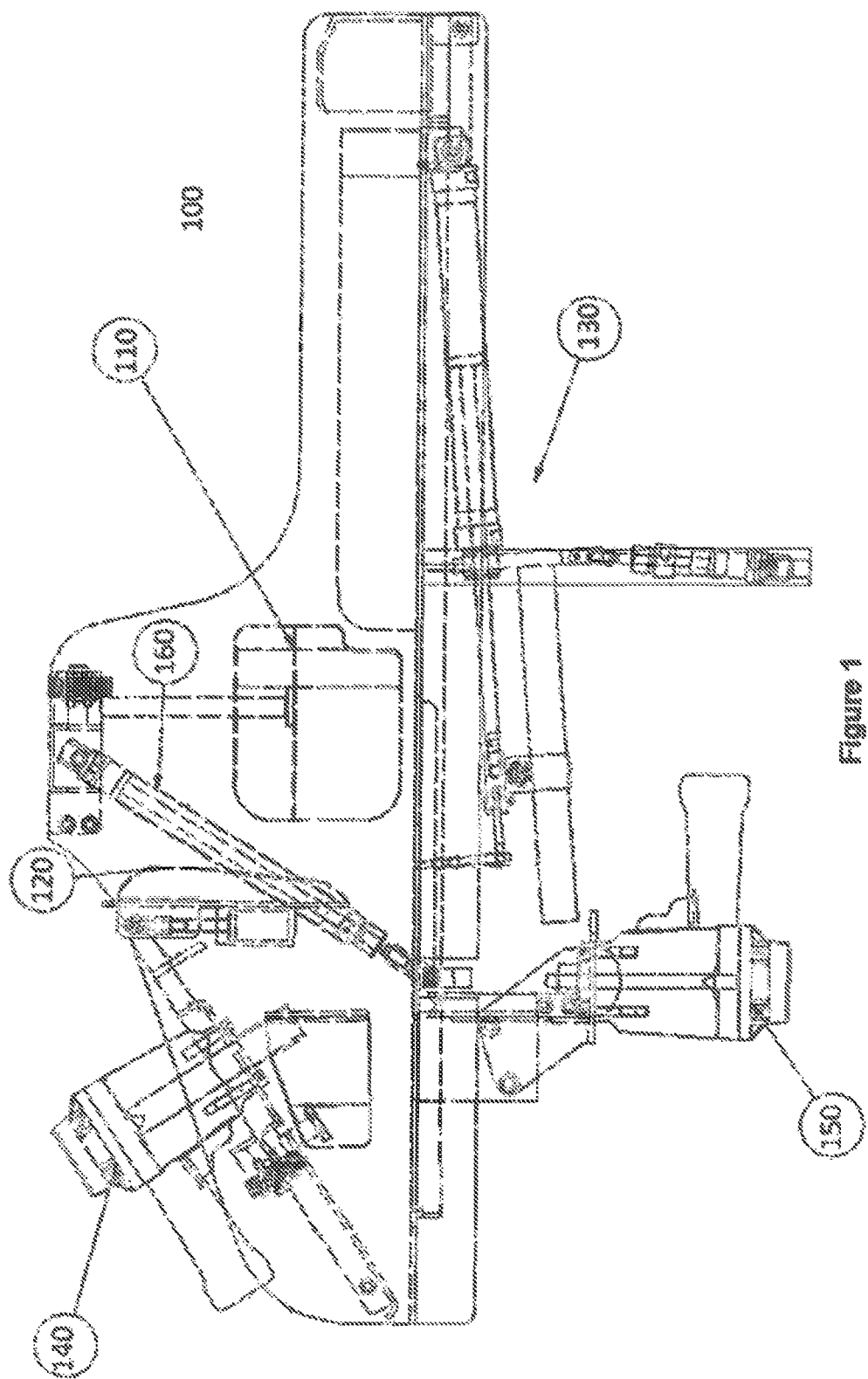
FIG. 1 shows a side view of the apparatus for slaughtering fish in resting position.

As previously indicated, and according to the annexed drawings, the present invention consists in an apparatus (100) for slaughtering fish, which causes the death of the fish by taking it from the operculum to be positioned in a stunning position and cutting the gills, without causing any visible damage to the exterior, where said apparatus comprises:

transverse positioning means (110), which receive the fish, hold it by the sides and keep it in the center to be positioned in an initial working position;

longitudinal positioning means (120) allowing longitudinal movement of the fish and stopping its movement when the fish is in the initial working position;

gripping means (130) to take the fish from the initial working position, holding it from the operculum and placing it in a stunning position, also allowing the opening of the operculum to expose the gills in a cutting position;

stunning means (140) to stun the fish, which is in the stunning position;

cutting means (150) to perform a precise cut in the gills of the stunned fish, and releasing means (180) which allow the release of the dead fish.

Figure 3:
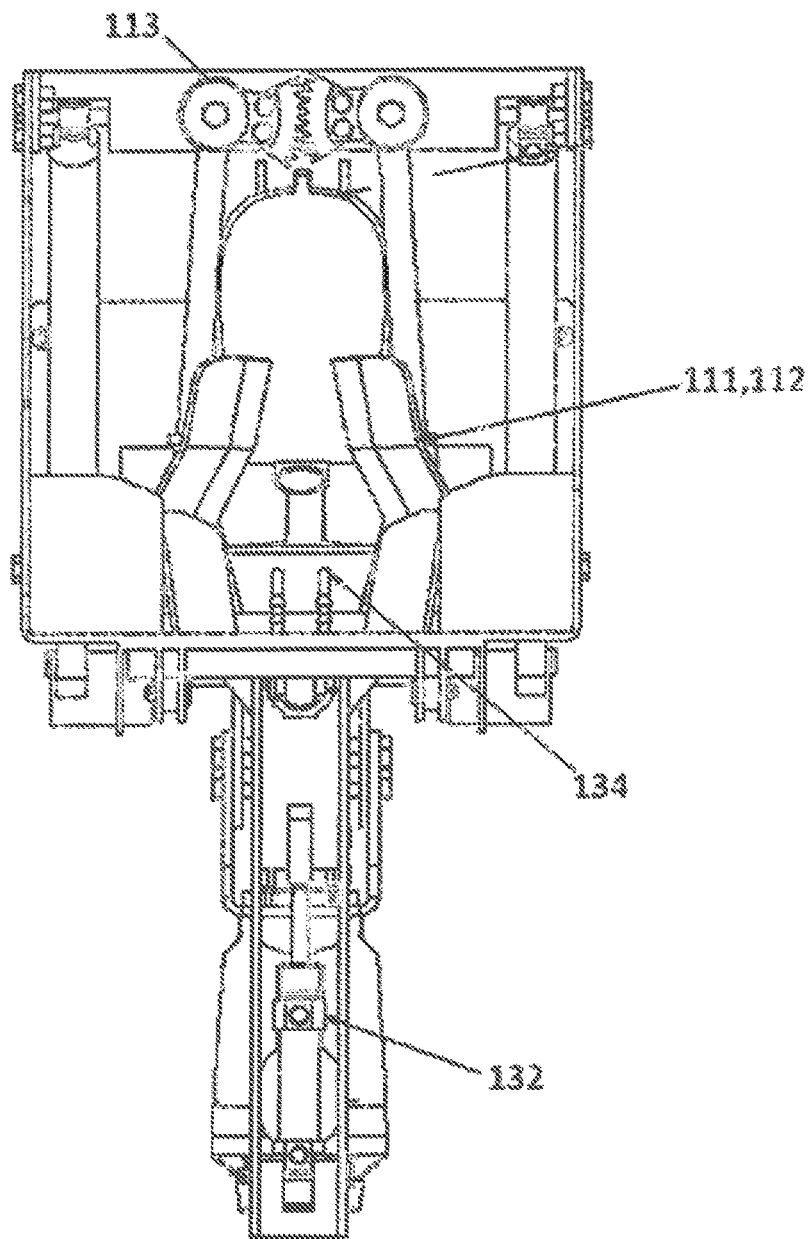
FIG. 3 shows a front view of the apparatus for slaughtering fish in resting position.

Preferably, the transverse positioning means (110) comprises two pivotable walls (111,112), which are connected by a gear system (113) so as to prevent them to move independently, as shown in FIG. 3. Thus, these means receive the fish in a slaughtering position (his head is forwardly oriented, whereas the abdomen is downwardly oriented), which may be introduced by gravity or by an operator.

Furthermore, preferably the transverse positioning means (110) comprises a spring which allows to hold the two walls (111,112) so that these conform to the fish, thus preventing lateral movement and allowing the horizontal movement thereof. The longitudinal positioning means (120) comprise a front wall (121), a sensor that detects the presence of the fish, a stop (123) connected to a plate (122) and an unlocking device (125).

Figure 2:
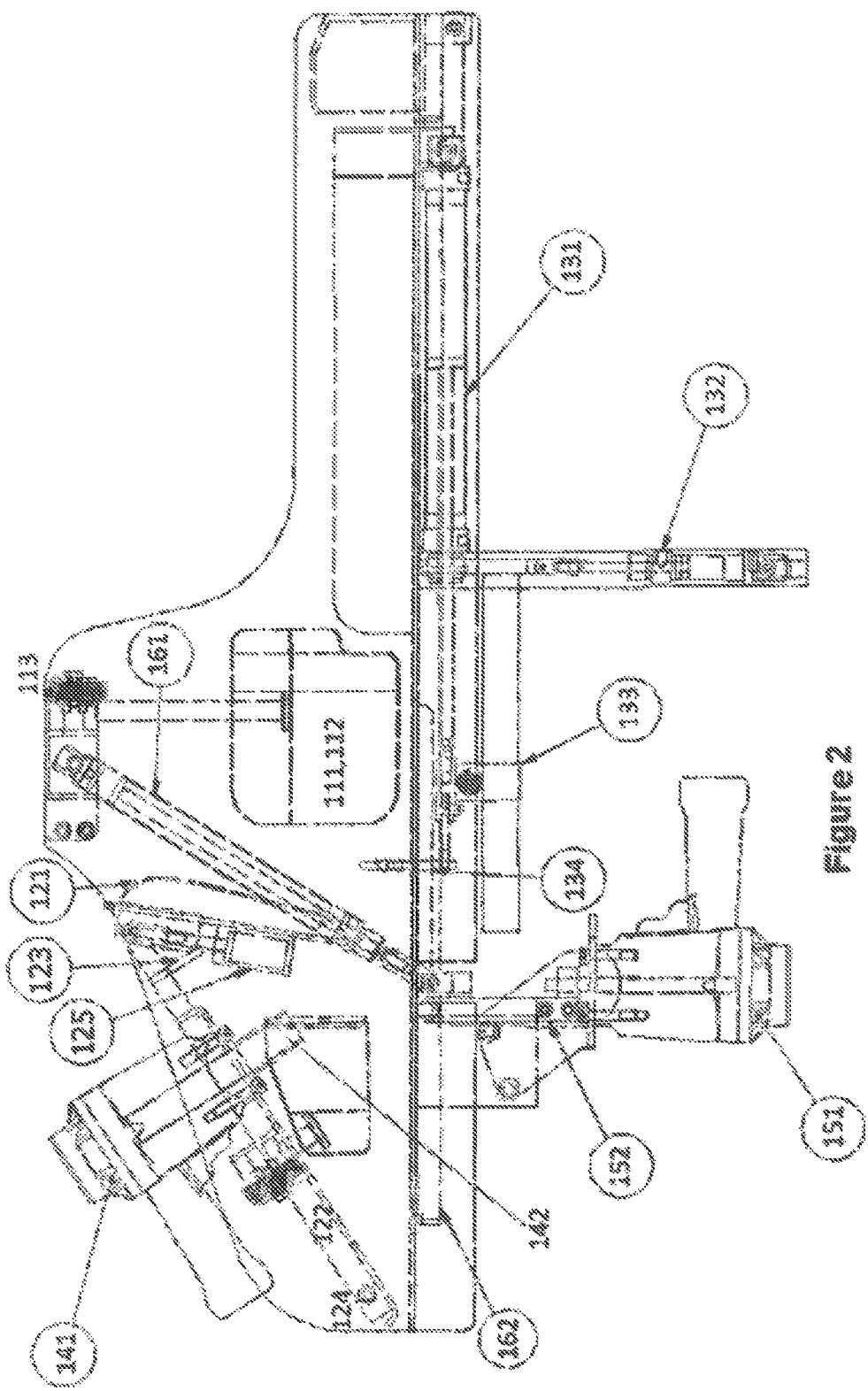
FIG. 2 shows a side view of the apparatus for slaughtering fish in initial working position.
Figure 4:
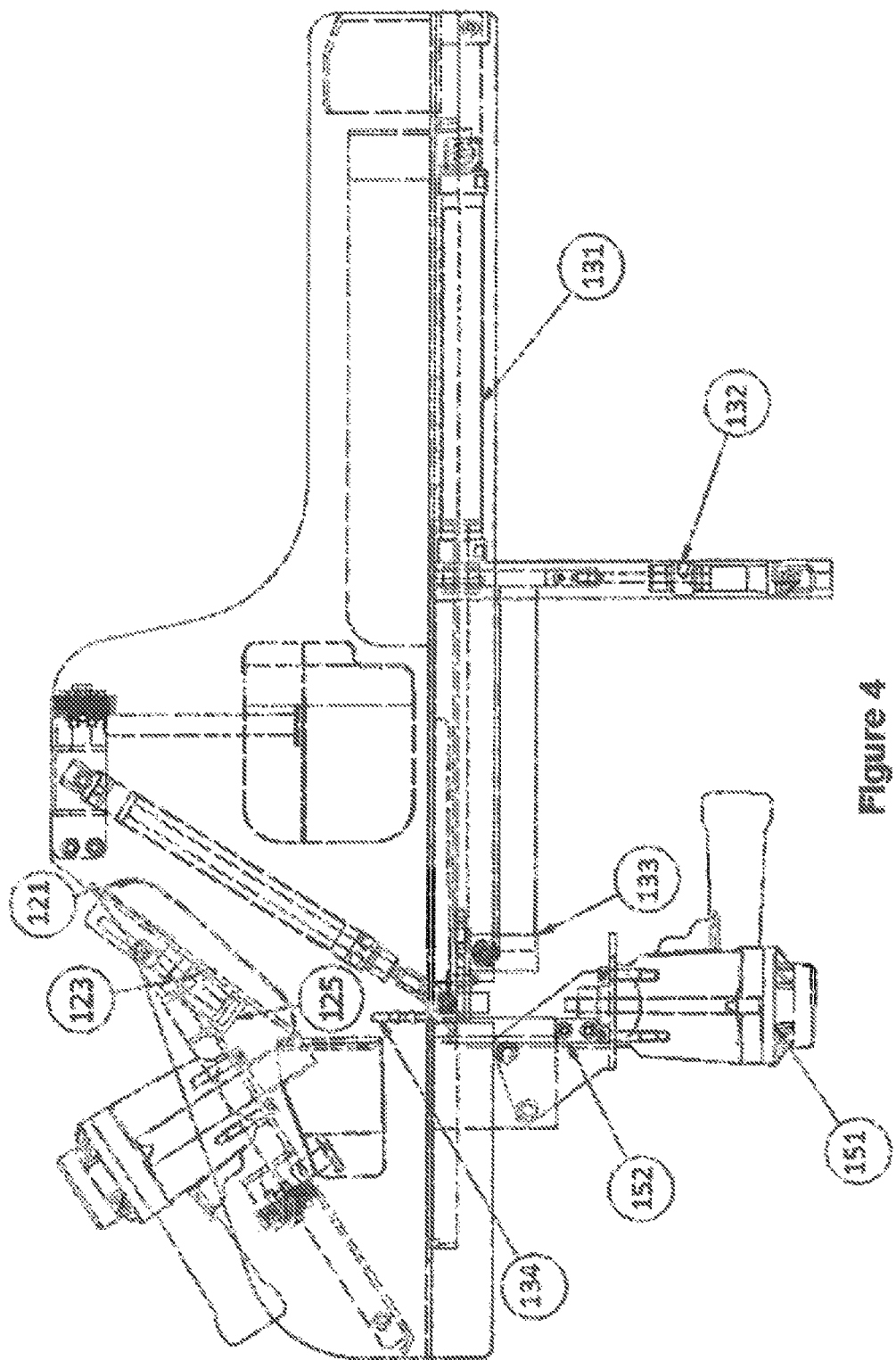
FIG. 4 shows a side view of the apparatus for slaughtering fish in stunning position.
Figure 5:
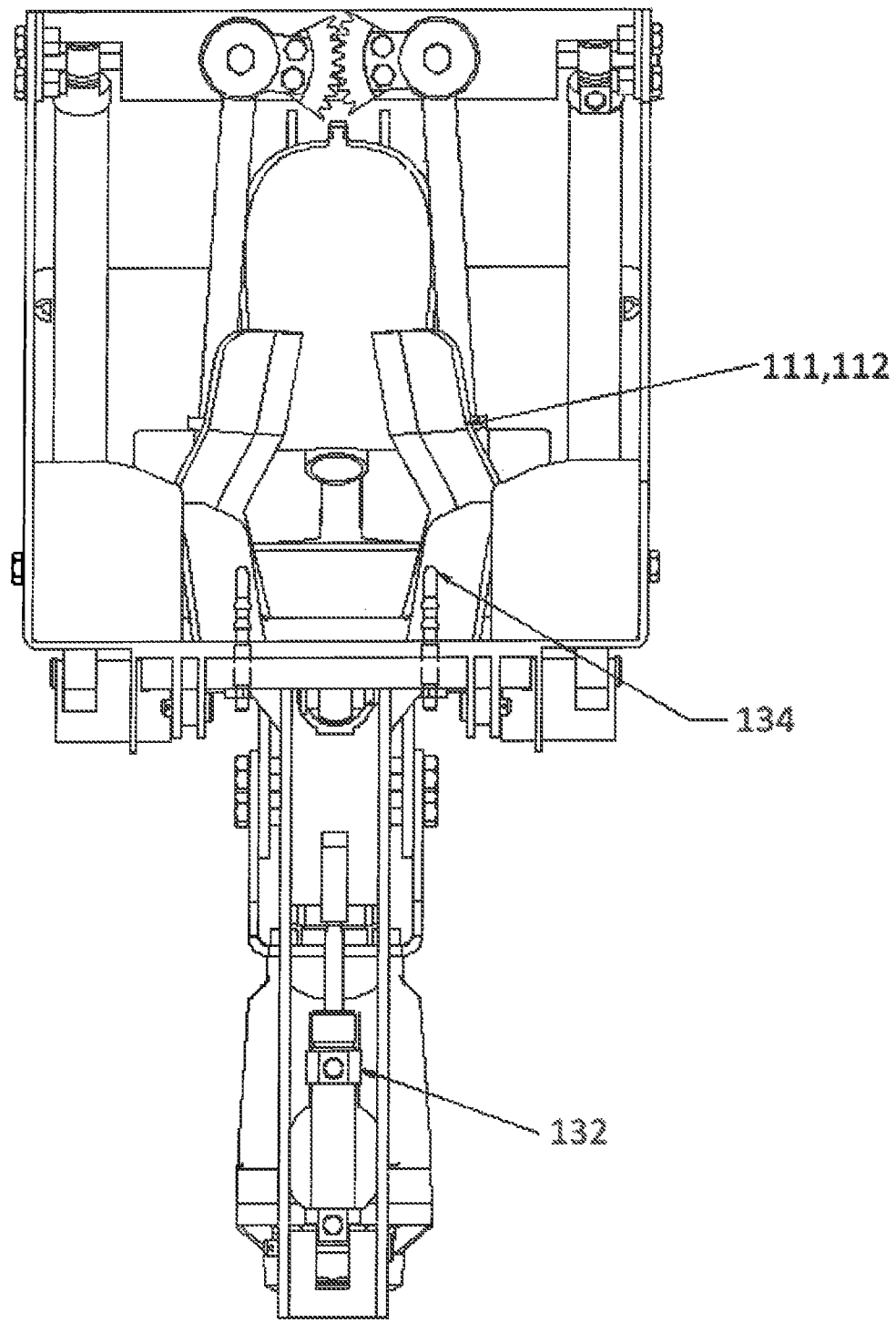
FIG. 5 shows a front view of the apparatus for slaughtering fish in stunning position.
Figure 6:
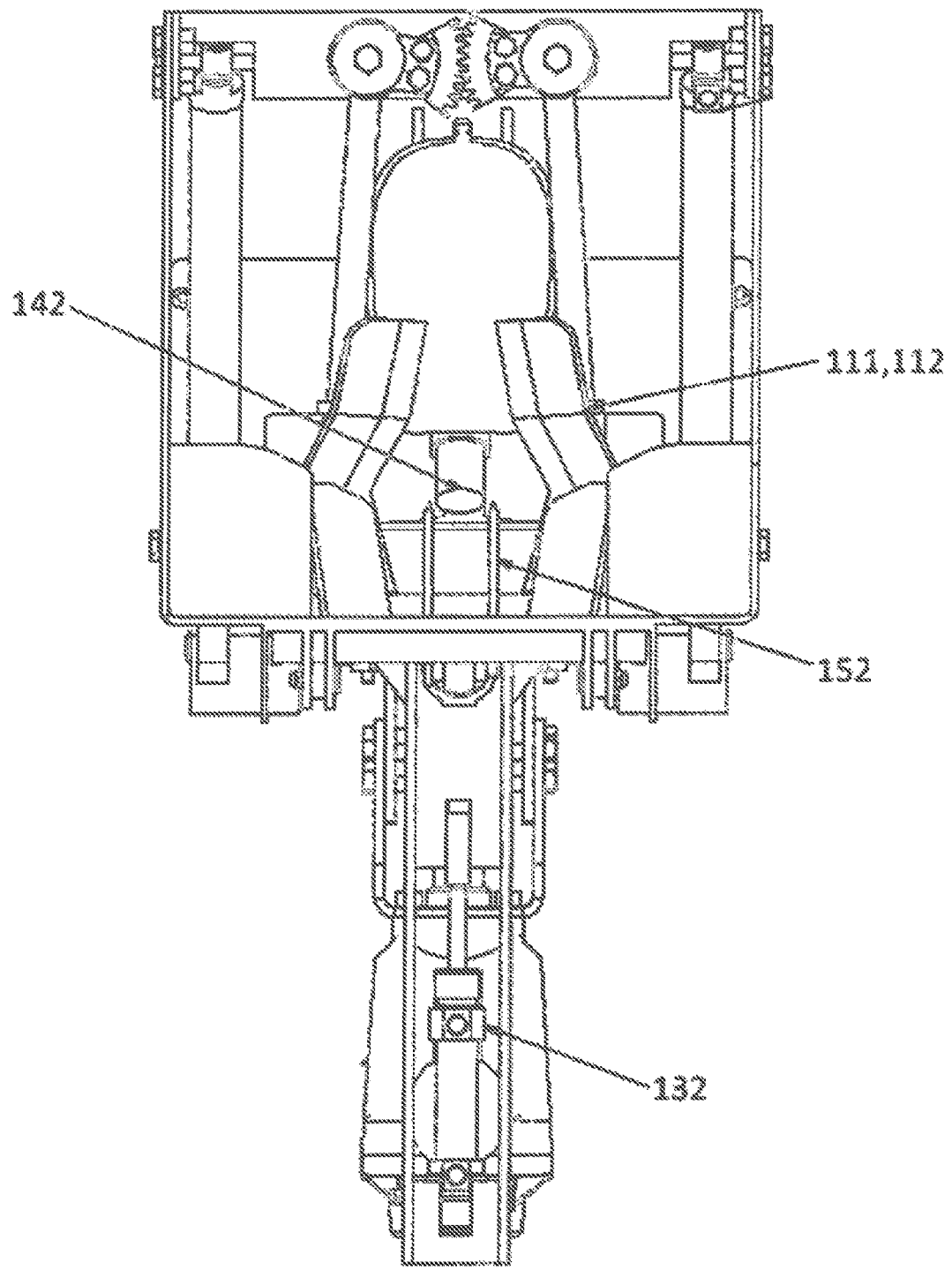
FIG. 6 shows a front view of the apparatus for slaughtering fish in stunning position after stunning the fish and cutting its gills.

The front wall (121) is connected at one end to the plate (122), on which pivots freely. Additionally, on the plate (122) stunning means are located and said plate pivots on a lower end (124) so as to position the stunning means in the stunning position. Thus, as shown in FIGS. 2 and 4, the fish is moved through the apparatus (100) contacting the front wall (121) until it collides with the stop (123), thereby stopping the advance of the fish and placing it in the initial working position. When the fish is in the initial working position the sensor detects the presence of the fish and activates the unlocking device (125), thus allowing the free movement of the front wall (121), and simultaneously activates vertical driving means (132) which can raise two engaging means (134) to be inserted into the operculum of the fish.

Figure 9A:
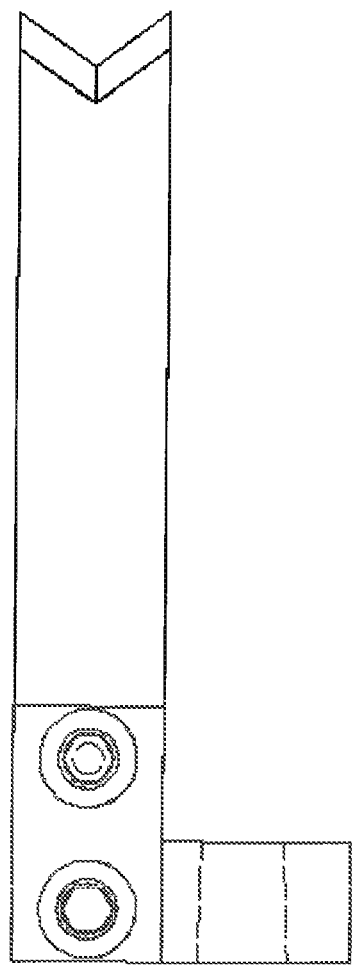
FIGS. 9a and 9b show a side and isometric view respectively, of the gill cutting knife.
Figure 9B:
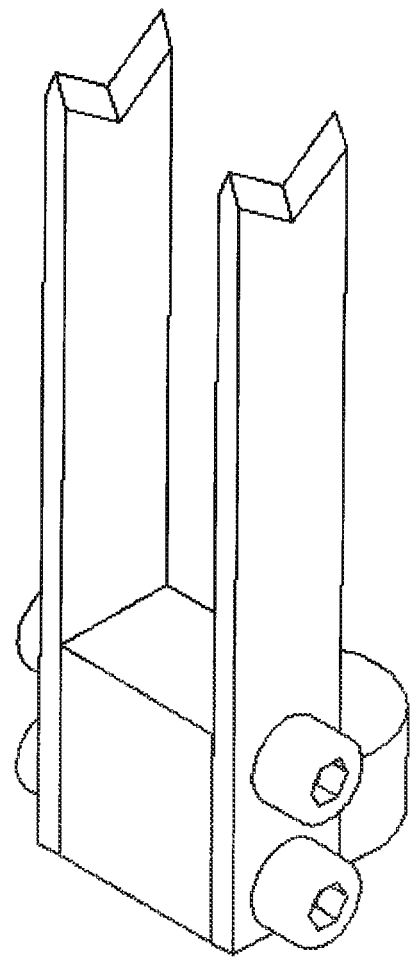

Thus, the gripping means (130) comprise said vertical driving means (132) that allows to insert two engaging means (134) to the inside of the operculum of the fish, and further comprises horizontal driving means (131) that allows moving the fish through the engaging means (134) as soon as the gripping means are located inside the operculum of the fish, so that it is positioned at stunning and cutting positions. The engaging means (134) are arranged on a carriage (133) which is connected to horizontal driving means (131). Furthermore, as shown in FIG. 9, the opening of the operculum is performed by separating both engaging means (134), which can be performed through guides, springs, or any separation medium with satisfactorily fulfill said task.

As previously mentioned, the stunning means (140) are arranged on the plate (122) and preferably consist of a first pneumatic gun (141) actuating a piston (142) which hits the head of the fish when it is located in a stunning position.

Figure 10:
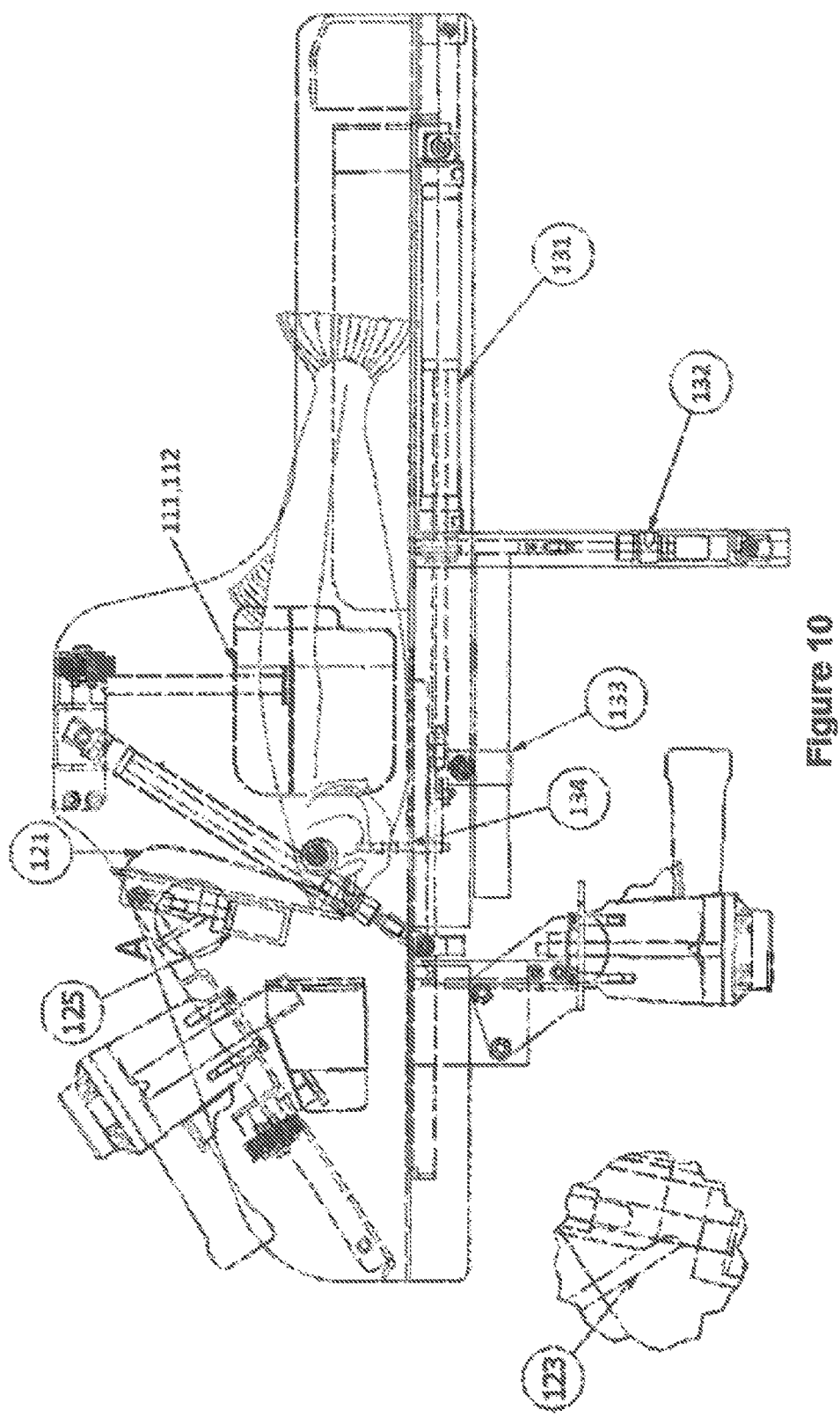
FIG. 10 shows a side view of the apparatus for slaughtering fish, where the manner in which the grapping means holds the fish can be observed.

The cutting means (150) are arranged in the bottom of the apparatus (100), and comprise a second pneumatic gun (151) actuating two blades (152) positioned so as to perform a precise cut in the gills of the fish, as shown in FIG. 10, without causing visible damage to the exterior thereof.

Figure 7:
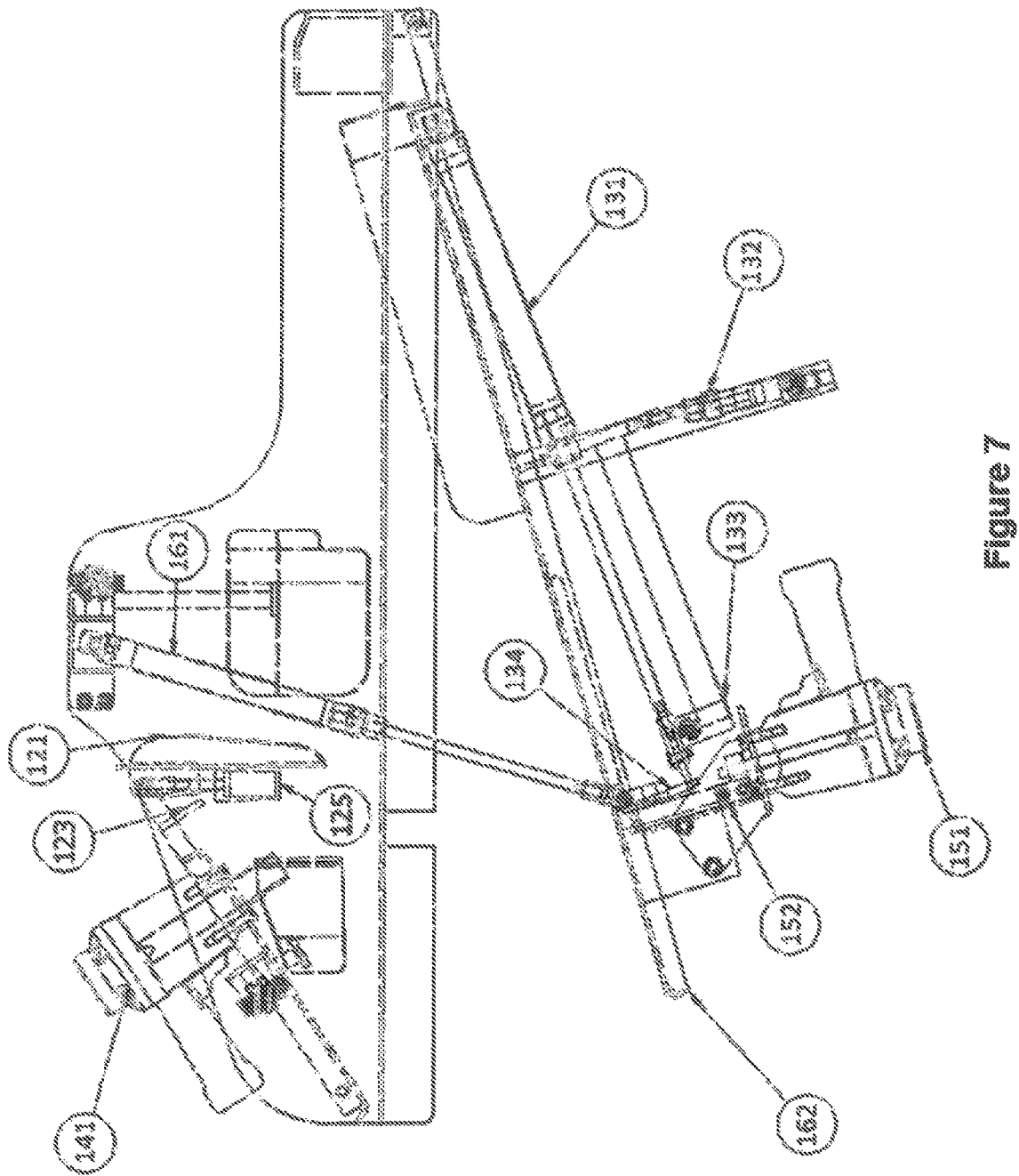
FIG. 7 shows a side view of the apparatus for slaughtering fish in position of releasing the slaughtered fish.
Figure 8A:
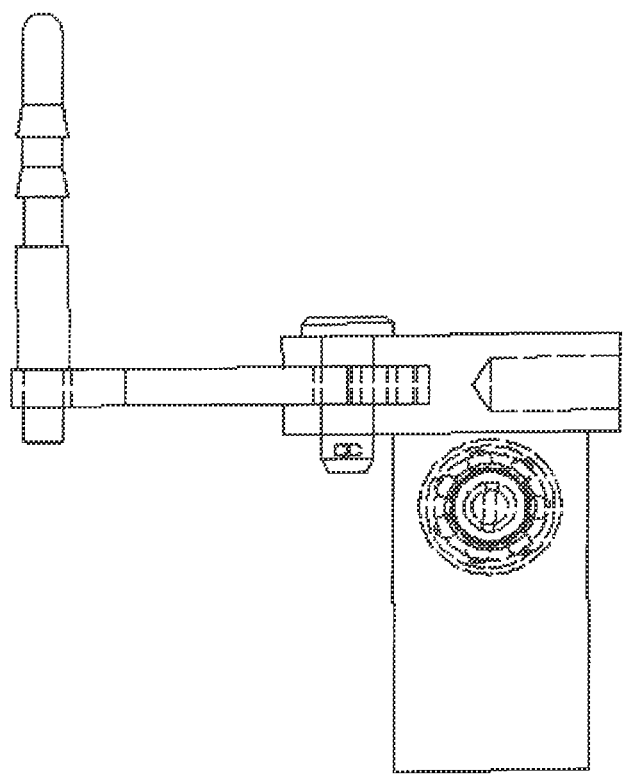
FIG. 8a shows a side view of the carriage housing the grapping means, which allow to hold the operculum of the fish.
Figure 8B:
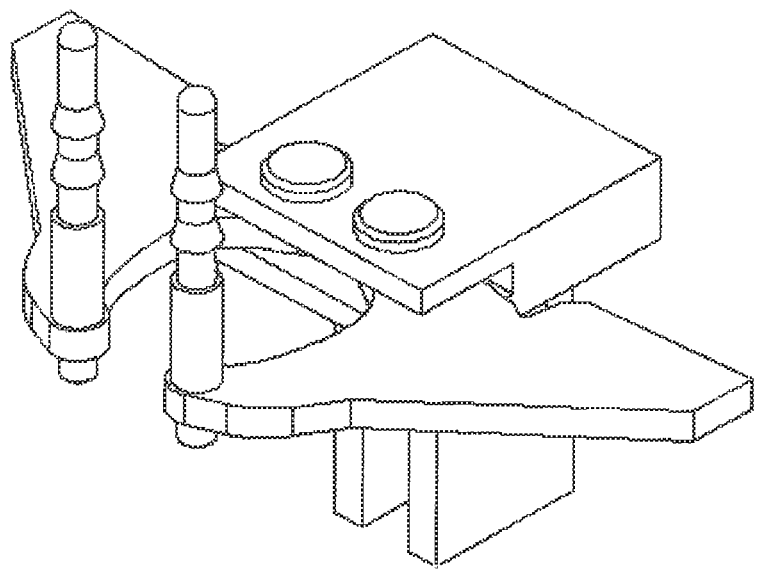
FIG. 8b shows an isometric view from the carriage housing the grapping means.

Releasing means (160) comprise a platform (162) on which the fish is slaughtered and which is connected to a platform actuating means (161). As shown in FIG. 7, said platform actuating means (181) permits the opening of the platform (162) so as to release the fish, which has been already slaughtered.

Thus, as soon as the fish is dead, the piston (142), the first pneumatic gun (141), the blades (152), the second pneumatic gun (151) and the vertical driving means (132) return to their starting position, at which the platform actuating means (181) is activated to release the slaughtered fish. Then, the horizontal driving means (131) and the platform actuating means (161) are activated to leave the apparatus (100) in its starting position, ready to receive the next fish.

The invention claimed is:

1. An apparatus for slaughtering fishes, which causes the death of the fish, taking the fish from an operculum to be positioned in a stunning position and cutting only the gills, without causing any visible damage to an exterior part of the fish, comprising:

transverse positioning means, for receiving the fish, holding the fish by the sides and keeping the fish centered to be positioned in an initial working position;

longitudinal positioning means, for allowing longitudinal displacement of the fish and stopping the fish's movement when in the initial working position;

gripping means for taking the fish from the initial working position, holding the fish from the operculum and placing in a stunning position, also allowing the opening of the operculum to expose the gills of the fish in a cutting position;

stunning means for stunning the fish that is in the stunning position;

cutting means for performing a cut in the gills of the stunned fish; and releasing means for allowing the release of the slaughtered fish.

2. The apparatus for slaughtering fishes according to claim 1, wherein the transverse positioning means comprises two pivotable walls, which are connected by a gear system in such a manner to prevent them from moving independently.

3. The apparatus for slaughtering fishes according to claim 2, wherein the transverse positioning means comprises a spring which allows containing the two walls so that these adjust to the fish.

4. The apparatus for slaughtering fishes according to claim 1, wherein the longitudinal positioning means comprises a front wall, a sensor that detects the presence of the fish, a stop connected to a plate and a locking retractor; wherein the front wall is connected at one end to the plate, on which pivots freely, and the sensor activates the locking retractor to allow the movement of the front wall also activating a vertical driving means which can raise two means for engaging the fish to be inserted into the operculum of the fish.

5. The apparatus for slaughtering fishes according to claim 4, wherein on the plate, stunning means are located and said plate pivoting on a bottom end in such a manner to position the stunning means in the stunning position.

6. The apparatus for slaughtering fishes according to claim 4, wherein the gripping means comprises means for driving vertically the two means for engaging the fish, and means for driving horizontally and allowing displacement of the fish through the means for engaging the fish so as to be positioned at the stunning and cutting positions.

7. The apparatus for slaughtering fishes according to claim 6, wherein the means for engaging the fish is arranged on a carriage which is connected to the horizontal driving means, and the opening of the operculum being performed by separation of the two means for engaging the fish.

8. The apparatus for slaughtering fishes according to claim 1, wherein the stunning means consists of a first pneumatic pistol driving a piston which strikes the head of the fish when it is in the stunning position.

9. The apparatus for slaughtering fishes according to claim 1, wherein the cutting means comprises a second pneumatic pistol driving two knives positioned in such a manner to perform a cut in the gills of the fish.

10. The apparatus for slaughtering fishes according to claim 1, wherein the releasing means are comprised of a platform on which the fish is slaughtered, and which is connected to means for actuating the platform that allows opening the platform so as to release the slaughtered fish.

* * * * *